(12) United States Patent
Suzuki et al.

(10) Patent No.: US 10,391,903 B2
(45) Date of Patent: Aug. 27, 2019

(54) SEAT FRAME FOR VEHICLE SEAT AND METHOD OF MANUFACTURING THE SAME

(71) Applicant: TOYOTA BOSHOKU KABUSHIKI KAISHA, Aichi-ken (JP)

(72) Inventors: Hiroyuki Suzuki, Aichi-ken (JP); Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/710,179

(22) Filed: Sep. 20, 2017

(65) Prior Publication Data

US 2018/0086242 A1    Mar. 29, 2018

(30) Foreign Application Priority Data

Sep. 28, 2016 (JP) .................. 2016-189379

(51) Int. Cl.
 *B60N 2/60* (2006.01)
 *B60N 2/68* (2006.01)

(52) U.S. Cl.
 CPC ............... *B60N 2/68* (2013.01); *B60N 2/682* (2013.01)

(58) Field of Classification Search
 CPC .................. B60N 2/68; B60N 2/682

USPC ...................................... 297/452.18
See application file for complete search history.

(56) References Cited

U.S. PATENT DOCUMENTS

| 6,220,669 | B1 * | 4/2001 | Frohnhaus | B60N 2/1615 297/440.14 |
| 2009/0152929 | A1 * | 6/2009 | Sung | B60N 2/68 297/452.18 |
| 2009/0289491 | A1 * | 11/2009 | Nakagaki | B60N 2/682 297/452.2 |
| 2017/0313224 | A1 * | 11/2017 | Akaike | B60N 2/68 |

FOREIGN PATENT DOCUMENTS

DE     4233944 A1 *  4/1994  ............ B60N 2/688
JP     2015-101286    6/2015

* cited by examiner

*Primary Examiner* — Syed A Islam
(74) *Attorney, Agent, or Firm* — Greenblum & Bernstein, P.L.C.

(57) ABSTRACT

A seat frame for a vehicle seat is configured to extend in a specific direction and having a closed cross sectional shape. The seat frame includes: a bent portion having a shape in which a part of a cross section shape of the seat frame is bent inward and outward of the closed cross section; and a shape-changing structure in which a bending shape of the bent portion changes in the specific direction.

4 Claims, 14 Drawing Sheets

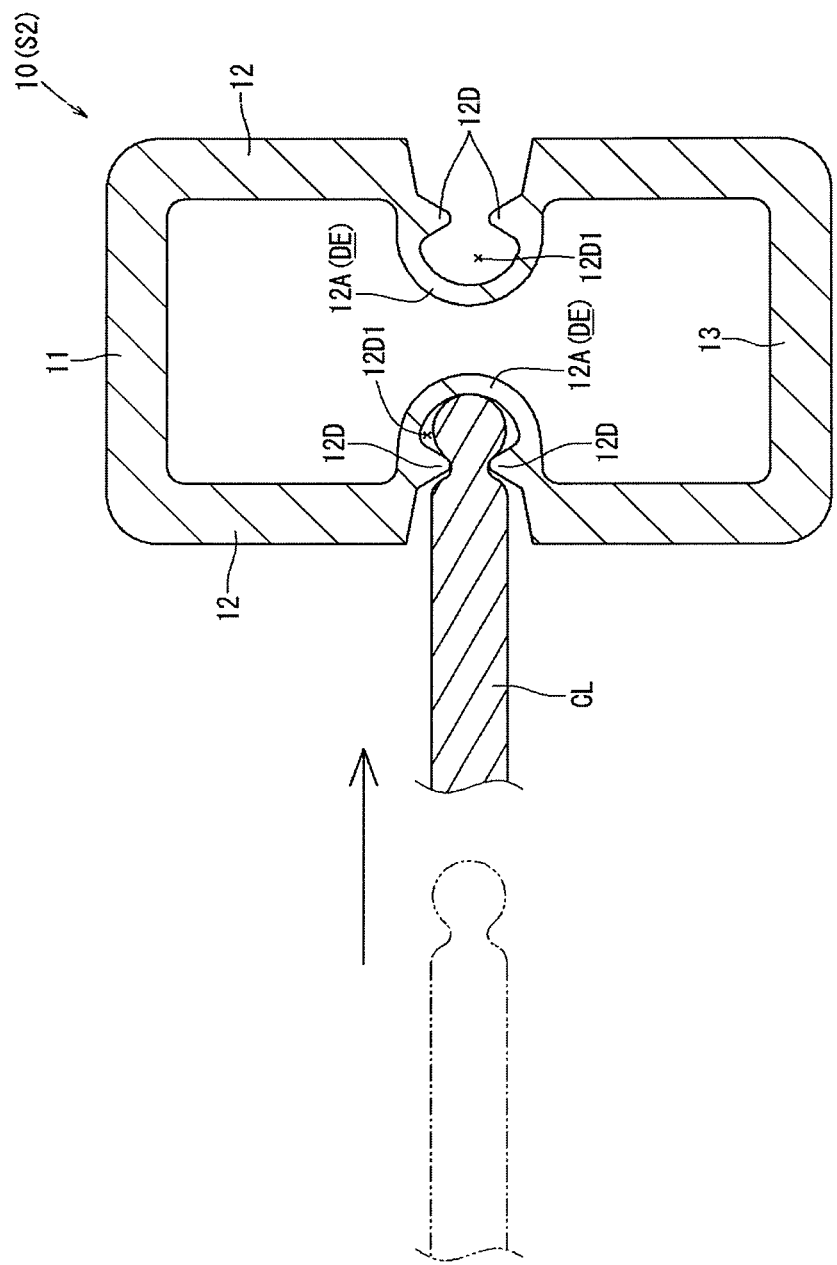

SEAT FRAME FOR VEHICLE SEAT AND METHOD OF MANUFACTURING THE SAME

CROSS-REFERENCE TO RELATED APPLICATION

This application claims priorities from Japanese Patent Application No. 2016-189379 filed on Sep. 28, 2016, the entire subject matters of which is incorporated herein by reference.

TECHNICAL FIELD

The present disclosure relates to a seat frame for a vehicle seat and a method of manufacturing the same. More particularly, the present disclosure relates to a seat frame for a vehicle seat, extending in a specific direction and having a closed cross sectional shape, and a method of manufacturing the same.

BACKGROUND

In the related art, there is known a vehicle seat having a seat frame that is formed to have a closed cross sectional shape with a uniform horizontal cross sectional shape through aluminum extrusion molding (see, for example, JP-A-2015-101286). The seat frame having a closed cross sectional shape is provided with weight reduction holes by which the cross sectional shape of the seat frame is locally open. This structure aims to optimize balance between structural strength and weight.

However, even the closed cross sectional seat frame provided with weight reduction holes at a portion thereof as in the related art, has no change in external dimension as a seat frame, thereby not providing a space saving effect.

SUMMARY

The present disclosure is made in consideration of the above-mentioned circumstances, and one of objects of the present disclosure is to provide a vehicle seat and a manufacturing method for manufacturing the vehicle seat to effectively optimize the structural strength of a seat frame while providing a space saving effect.

According to an illustrative embodiment of the present disclosure, there is provided a seat frame for a vehicle seat, the seat frame extending in a specific direction and having a closed cross sectional shape. The seat frame includes: a bent portion having a shape in which a part of a cross section shape of the seat frame is bent inward and outward of the closed cross section; and a shape-changing structure in which a bending shape of the bent portion changes in the specific direction.

According to another illustrative embodiment of the present disclosure, there is provided a method of manufacturing a seat frame for a vehicle seat. The seat frame extends in a specific direction and having a closed cross sectional shape. The method includes: a frame forming process in which the seat frame is formed to extend in the specific direction while having a hollow cross sectional shape; and a bending process in which a part of the cross section of the seat frame having a predetermined cross sectional shape, formed through the frame forming process, is deformed and bent inward and outward of the closed cross section, wherein, in the bending process, the seat frame is bent and deformed such that the closed cross sectional shape of the seat frame changes in the specific direction.

BRIEF DESCRIPTION OF THE DRAWINGS

In the accompanying drawings:

FIG. 14 is a cross sectional view illustrating a state in which a clip is fitted in a recess.

DETAILED DESCRIPTION

Preferred embodiments of the present disclosure will be described below with reference to the accompanying drawings.

First Embodiment

Basic Configuration of Seat 1

Figure 1:
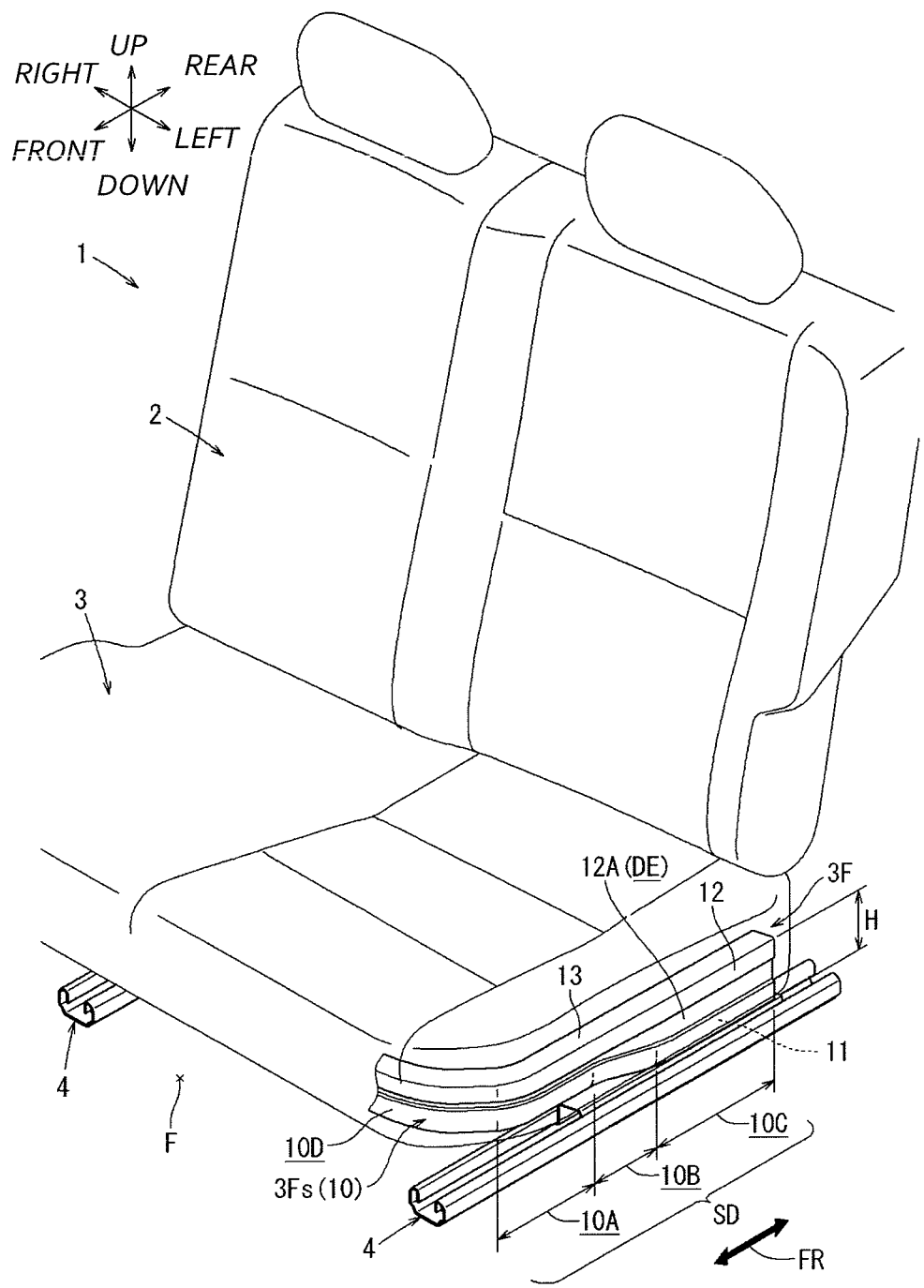
FIG. 1 is a perspective view illustrating a schematic structure of a seat frame for a vehicle seat according to a first embodiment.

First, the configuration of a seat 1 to which a seat frame for a vehicle seat according to a first embodiment and a manufacturing method thereof are applied will be described with reference to FIGS. 1 to 6. According to a first embodiment, as illustrated in FIG. 1, the seat 1 is configured as a rear seat for an automobile and specifically as a so-called bench seat on which two passengers can sit thereon on the left and right sides. Specifically, the seat 1 is configured to include a left side seat and a center seat on which two passengers sit thereon such that the seat 1 constitutes an overall three-passenger seat by being assembled with a right side seat (not illustrated). A dimension ratio of the left side seat, the center seat, and the right side seat (not illustrated) in a widthwise direction is 4:2:4. That is, the seat 1 is configured as a bench seat which is broad in width direction such that a width dimension ratio of the seat 1 and the right side seat (not illustrated) is set to be 6:4.

The seat 1 includes a seat back 2 serving as a backrest for passengers sitting thereon and a seat cushion 3 serving as a seat portion. The seat back 2 is supported on the seat cushion 3 in such a manner that lower ends of left and right sides of the seat back 2 are respectively connected to rear ends of left and right sides of the seat cushion 3. The seat cushion 3 is connected to an automobile floor F via a pair of left and right slide rails installed on the automobile floor F.

The seat 1 is initially maintained in a locked state in which the slide rails 4 are locked not to allow sliding. That is, a position (hereinafter, referred to as "seat position) of the seat 1 on the floor F in a front-rear direction FR is fixed. When a lever (not illustrated) provided at the left side of the seat cushion 3 is raised, the locked state in which the slide rails are locked not to allow sliding is released, and the slide rails 4 are switched to an unlocked state in which the seat position can be adjusted. The slide rails 4 can be switched back to the locked state when the lever (not illustrated) is returned to its original position after the seat position is adjusted.

Regarding Configuration of Closed Cross Sectional Frame 10

Figure 2:
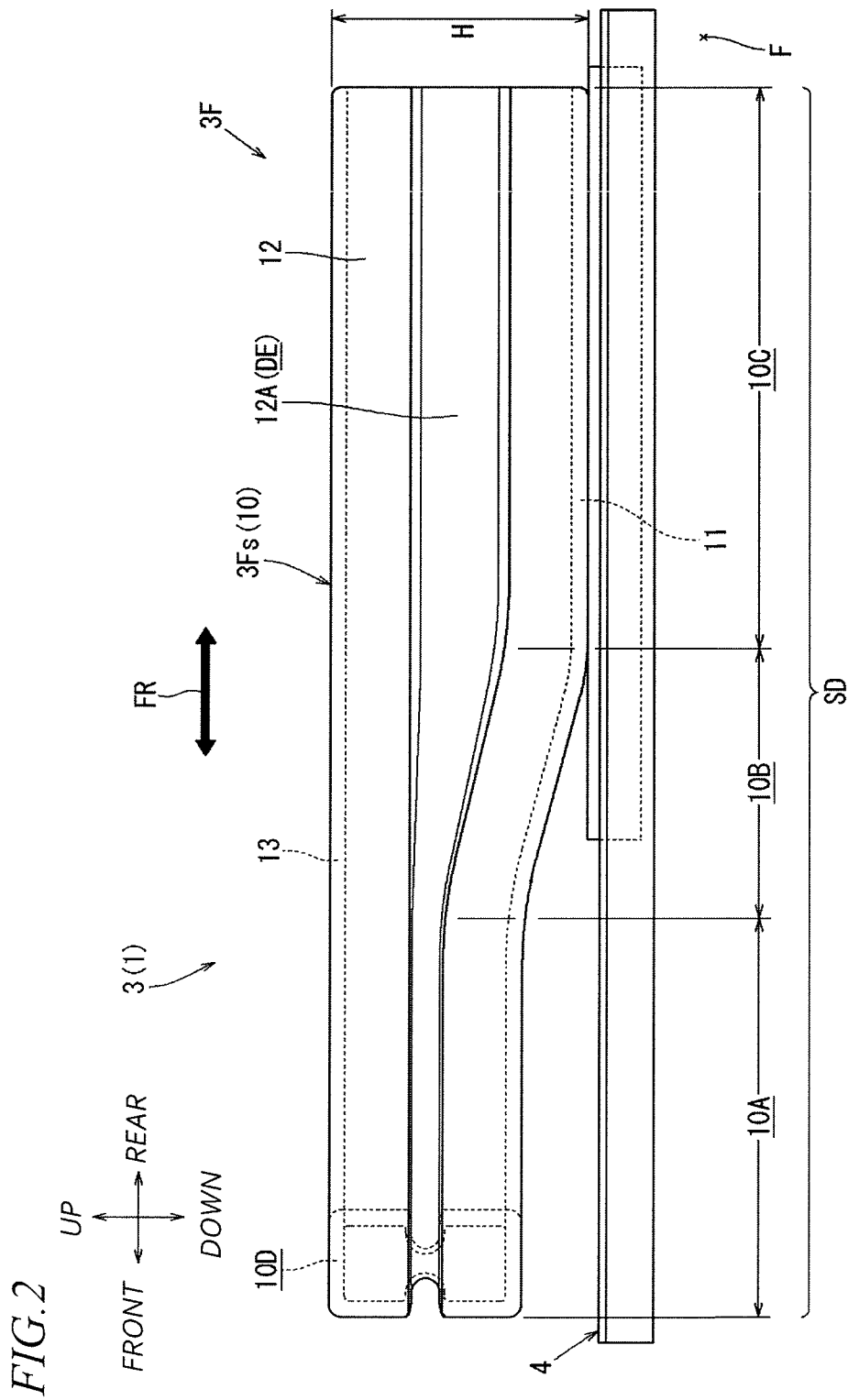
FIG. 2 is a side view of the seat frame.

Although not illustrated in details in the drawings, the seat cushion 3 includes a metallic cushion frame 3F that constitutes an internal skeleton thereof and which has a substantially rectangular frame shape extending along the outer peripheral edges of the seat cushion 3, in terms of a plan view. Among parts of the cushion frame 3F, as illustrated in FIGS. 1 and 2, a side frame 3Fs serving as a left side internal skeleton of the seat cushion 3 is a single closed cross sectional frame 10 having a square pipe shape and being elongated in a front-rear direction FR. Here, the closed cross sectional frame 10 corresponds to the "seat frame" in the present disclosure, and the front-rear direction FR in which the closed cross sectional frame 10 extends corresponds to a "specific direction" in the present disclosure.

In addition, a front part of the rectangular frame of the cushion frame 3F is provided as an extension region 10D that curvedly extends to the right from a front of the closed cross sectional frame 10 serving as the left side frame 3Fs. A rear part of the rectangular frame of the cushion frame 3F is provided by a rear pipe frame (not illustrated) that extends to the right and is connected to a rear end of the closed cross sectional frame 10 serving as the left side frame 3Fs. In addition, a plate-shaped lower arm (not illustrated) is connected to the rear end of the closed cross sectional frame 10 serving as the left side frame 3Fs. The lower end of the left side of the seat back 2 illustrated in FIG. 1 is connected to a distal end of the lower ax in (not illustrated) that obliquely extends upward and rearward from the rear end of the closed cross sectional frame 10 via a recliner (not illustrated).

As illustrated in FIG. 2, the left side frame 3Fs is assembled with an upper surface of the left slide rail 4 and is maintained in a state of being supported by the same slide rail from a lower side. Specifically, the left side frame 3Fs includes of a wide region 10C serving as a rear region of the closed cross sectional frame 10. The wide region 10C has a large vertical width H and has a cross sectional shape that extends straight in the front-rear direction FR. A bottom plate 11 of the wide region 10C of the left side frame 3Fs is bolted and fixed to the upper surface of the slide rail 4.

Figure 3:
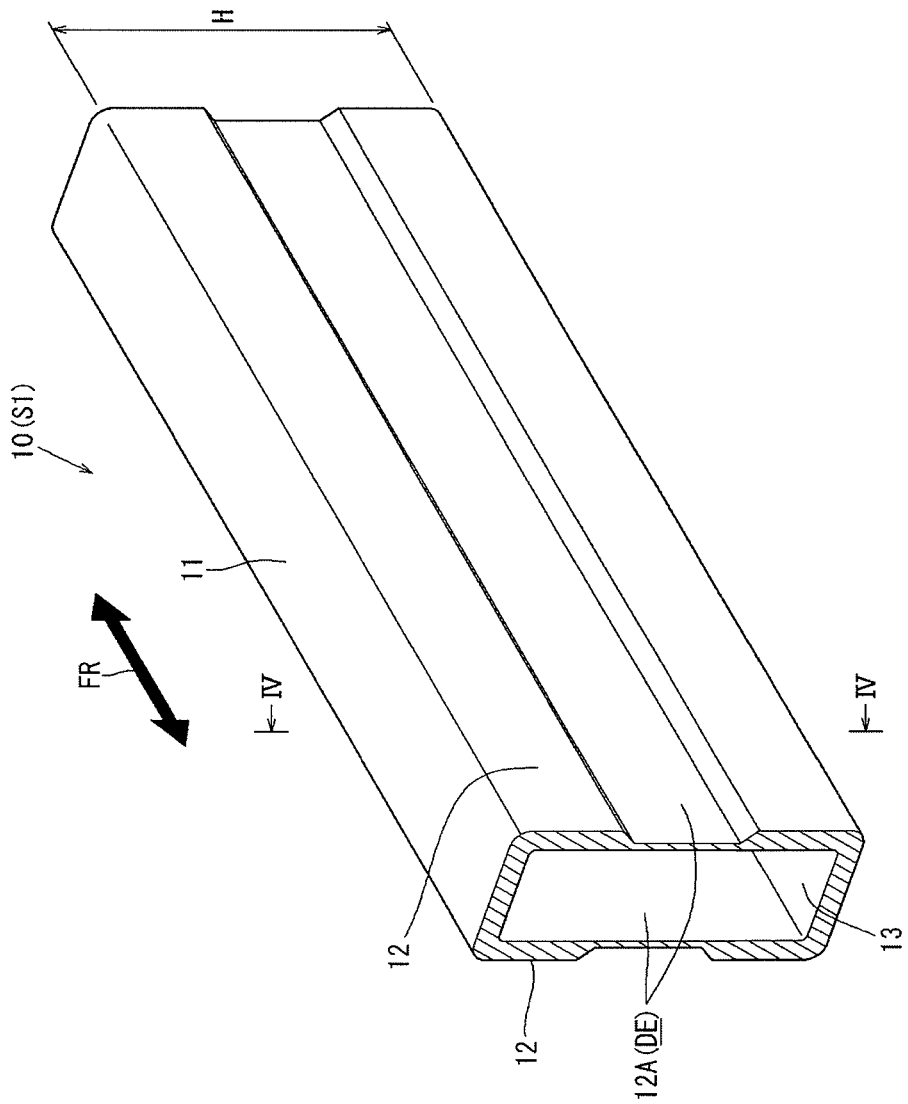
FIG. 3 is a perspective view schematically illustrating a frame forming process.
Figure 4:
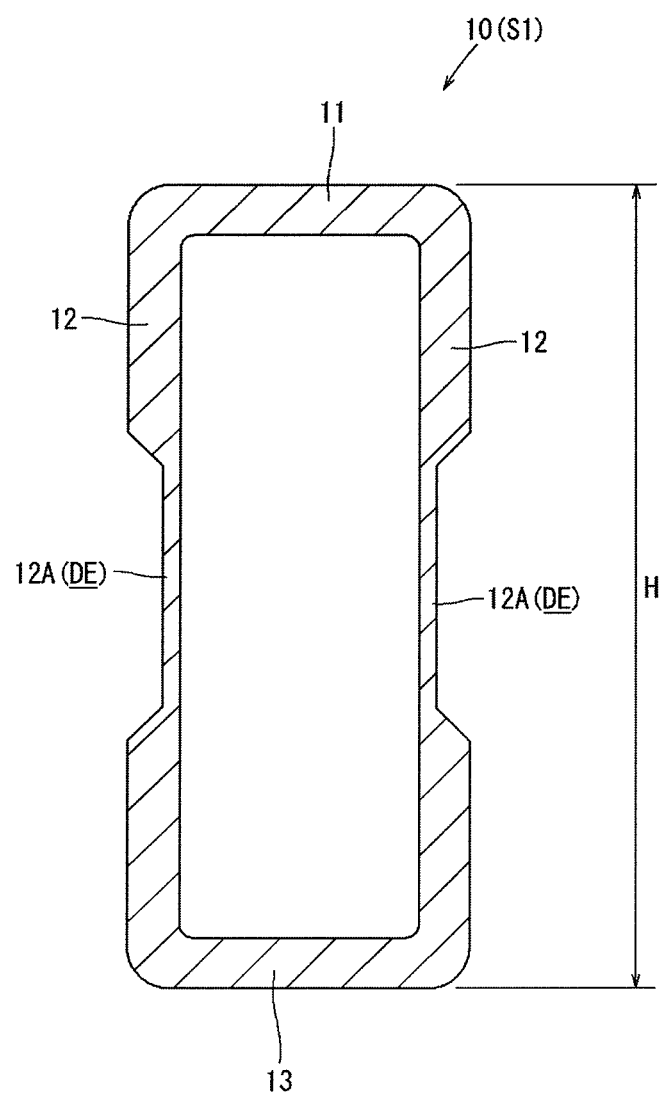
FIG. 4 is a cross sectional view taken along a line IV-IV of FIG. 3.
Figure 5:
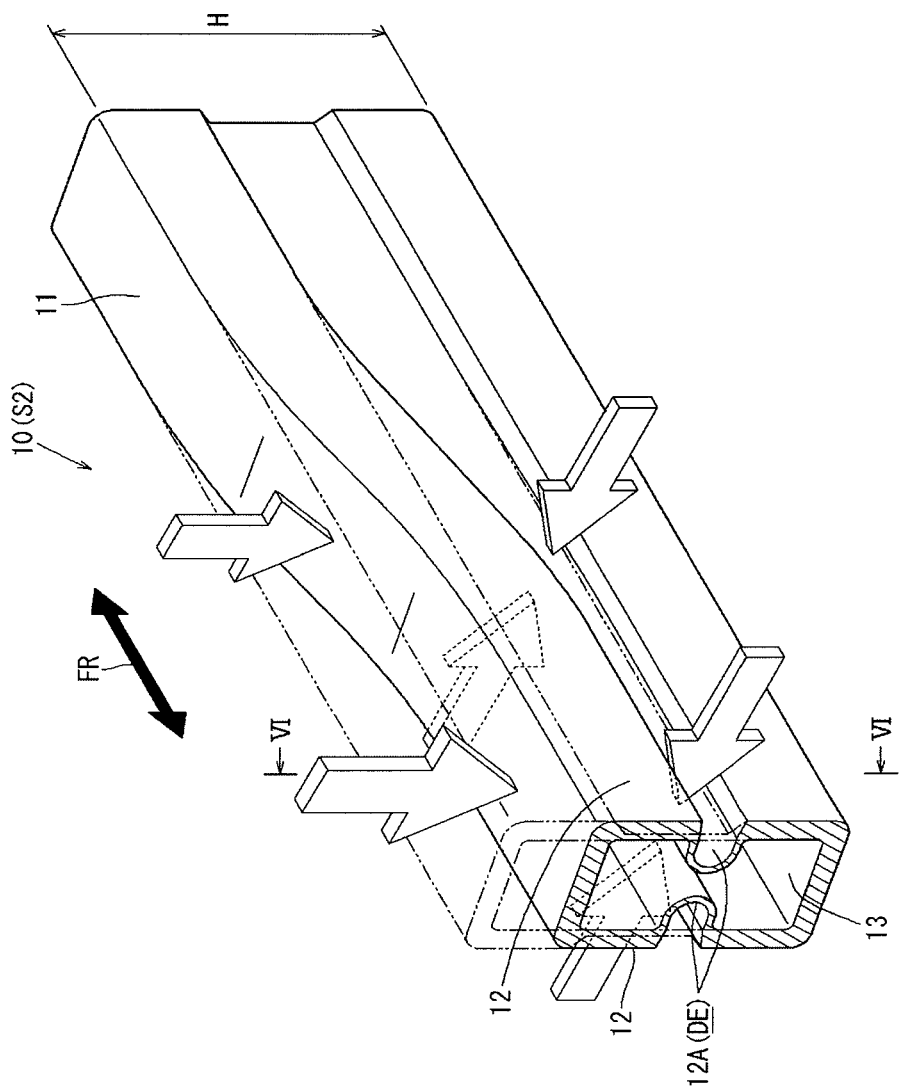
FIG. 5 is a perspective view schematically illustrating a bending process.
Figure 6:
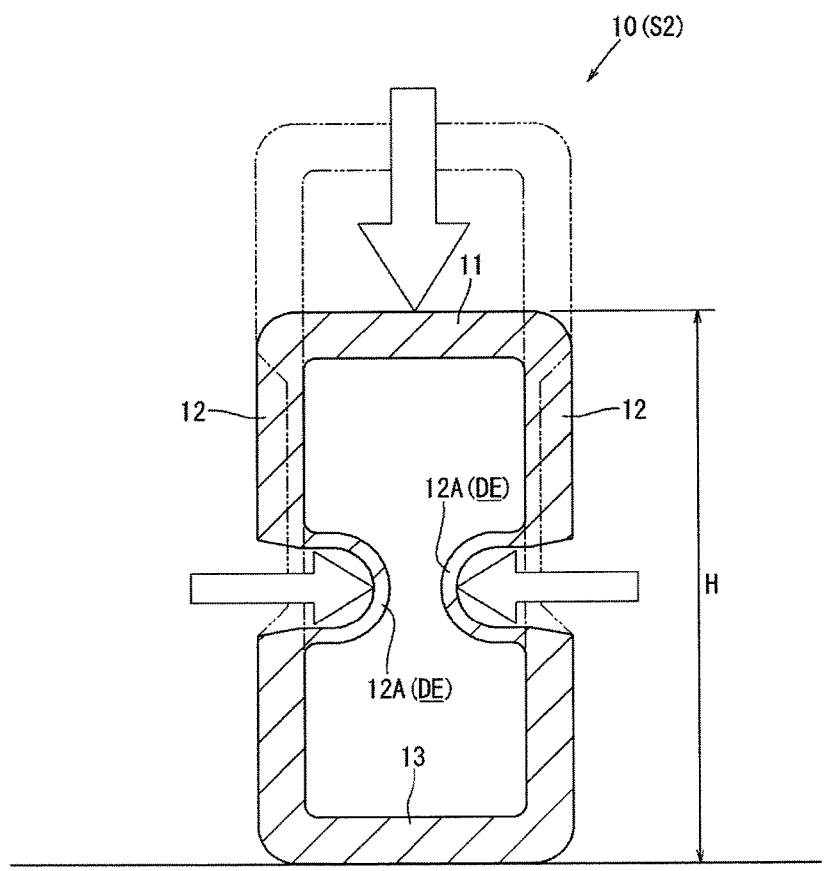
FIG. 6 is a cross sectional view taken along a line VI-VI of FIG. 5.

The closed cross sectional frame 10 serving as the left side frame 3Fs is formed through extrusion molding and press processing that are sequentially performed in this order. That is, first, as illustrated in FIGS. 3 to 4, in a frame forming process S1, an aluminum member (closed cross sectional frame 10) is produced through extrusion molding to have a shape extending with a uniform closed hollow cross sectional shape. Specifically, the aluminum member (closed cross sectional frame 10) is extrusion-molded to have a rectangular closed hollow cross section and extend in a longitudinal direction. Next, in a bending process S2, as illustrated in FIGS. 5 to 6, a portion (both left and right side plates 12) of the cross sectional shape from a middle region (gradually changing region 10B to be described below) to a front region (narrow region 10A to be described below) in the front-rear direction FR in which the extrusion-molded aluminum member (closed cross sectional frame 10) extends, undergoes press processing such that it is pressed and crushed in a height direction while being deformed to be dented toward the inside of the closed cross section.

Specifically, the press processing of the aluminum member (closed cross sectional frame 10) is performed in a manner to be described below. Namely, the press processing is performed such that the rear region (wide region 10C to be described below) of the extrusion-molded aluminum member (closed cross sectional frame 10) is maintained to have its original shape formed through the extrusion molding, the middle region (gradually changing region 10B to be described below) is pressed and crushed such that the amount of pressing and crushing in the height direction gradually increases toward the front side from the rear region (wide region 10C to be described below), and the front region (narrow region 10A to be described below) extends straight forward from the middle region while maintaining a cross sectional shape same as the cross sectional shape of a front end of the middle region (gradually changing region 10B), which is the most largely pressed and crushed. After the press processing is finished, the front of the aluminum member (closed cross sectional frame 10) is bent sideways to form the extension region 10D, as illustrated in FIGS. 1 and 2.

Through the forming process, the rear region of the closed cross sectional frame 10 is not pressed and crushed in the height direction, thereby becoming the wide region 10C extending straight in the front-rear direction FR while having the large vertical width H. In addition, the middle region of the closed cross sectional frame 10 in the front-rear direction FR is formed as the gradually changing region 10B that smoothly changes in its shape from the wide region 10C and in which the vertical width H thereof gradually decreases toward the front side in a manner that its bottom is gently slopped up toward the front side. The front region of the closed cross sectional frame 10 is provided as the narrow region 10A that extends straight toward the front side while maintaining the same cross sectional shape as that of the front end of the gradually changing region 10B, which is mostly pressed and crushed and that has a narrow vertical width H.

Specifically, as illustrated in FIG. 2, a top plate 13 of the closed cross sectional frame 10 has a straight planar surface with one plane extending over the wide region 10C on the rear side, the gradually changing region 10B in the middle, and the narrow region 10A on the front side in the front-rear direction FR. As to a bottom plate 11 of the closed cross sectional frame 10, the bottom plate 11 extends straight in parallel with the top plate 13 in the wide region 10C disposed on the rear side in the front-rear direction FR, but extends obliquely upward toward the front side in the gradually changing region 10B disposed in the middle, and extends straight toward the front side in parallel with the top plate 13 again at the raised position in the narrow region 10A disposed on the front side. In addition, as illustrated in FIG. 5, each of the top plate 13 and the bottom plate 11 of the closed cross sectional frame 10 has a uniform horizontal width in the wide region 10C on the rear side, the gradually changing region 10B in the middle, and the narrow region 10A on the front side. However, as illustrated in FIG. 2, the vertical heights H of the top plate 13 and the bottom plate 11 vary depending on the regions.

As described above, since the closed cross sectional frame 10 has a gradually changing structure SD in which the vertical width H of the cross sectional shape gradually changes for each region in the front-rear direction FR. Therefore, in the wide region 10C disposed on the rear side and having the large vertical width H, the sectional secondary moment (section modulus) around a horizontal axis suitably increases. The top plate 13 of the closed cross sectional frame 10 extends straight in the front-rear direction FR and is in parallel with the bottom plate 11 of the wide region 10C on the rear side installed on the slide rail 4. Because of this structure, the closed cross sectional frame 10 is shaped such that the vertical width H of the cross sectional shape thereof gradually increases toward the rear side while the top plate 13 is not sloped up toward the rear side. The gradually changing structure SD described above corresponds to the "shape-changing structure" of the invention.

Because of this structure, the closed cross sectional frame 10, in the wide region 10C (rear side) arranged in the vicinity of a position directly below the hips of a seating person (not illustrated) is configured to strongly withstand a downward load applied by a high body pressure region such as the hips of the seating person. The closed cross sectional frame 10, in the narrow region 10A (front side) arranged in the vicinity of a position directly below the thighs of a seating person (not illustrated) is configured to be capable of supporting the thighs of a seating person at the raised position. Thus, the closed cross sectional frame 10 can strongly withstand the downward load that is applied to the narrow region 10A (front side) by the thighs of the seating person, by the wide region 10C (rear side) functioning to enhance the structural strength.

Through extrusion molding of an aluminum member illustrated in FIGS. 3 and 4, the closed cross sectional frame 10 is formed to have a substantially rectangular closed hollow cross section extending in the longitudinal direction. Namely, through the extrusion molding, the closed cross sectional frame 10 is formed to have a longitudinally elongated and substantially rectangular closed hollow cross section that is defined by a top plate 13 having a planar plate shape and disposed to be vertical to the height direction, a bottom plate 11 having a planar plate shape and arranged to face the top plate 13 in the height direction, and two side plates 12 having an erected plate shape and connecting ends of the top plate 13 and the bottom plate 11 to each other.

Specifically, each side plate 12 is provided with a thin wall portion 12A at a middle portion thereof in the height direction. The thin wall portion 12A has a smaller thickness, partially in a horizontal width direction, than other portions. The thin wall portions 12A of the left and right side plates 12 are symmetric to each other. The thin wall portions 12A are formed by thinning the middle portions of the side plates 12 such that the outer surfaces thereof are recessed. In this case, the inner surfaces of the side plates 12 are planar and only the outer surfaces of the side plates 12 are partially recessed to form a step shape.

After the extrusion molding is performed, the press processing is performed as illustrated in FIGS. 5 and 6. Namely, the thin wall portions 12A of the both side plates 12 are pushed inward such that the sides of the hollow cross section are deformed to be bent inward, and the bottom plate 11 is pushed toward the top plate 13 so as to be bent inward. Specifically, the pushing force is applied to the closed cross sectional frame 10 such that the crushing amount varies for each region of the closed cross sectional frame 10. Through this process, the closed cross sectional frame 10 is deformed such that the thin wall portions 12A of the side plates 12 are deformed to be bent and the vertical width H of the closed cross sectional frame 10 changes along the front-rear direction FR.

Specifically, since each side plate 12 has an eccentric structure in which the side plate 12 is partially and inwardly recessed by the thin wall portion 12A, a vertical compressive force applied between the bottom plate 11 and the top plate 13 acts as a force of causing the thin wall portion 12A of the side plate 12 to be bent in an inward direction of the hollow cross section to have a bow-like form. In addition, in the press processing, the thin wall portion 12A of the side plate 12 is also directly applied with the pushing force. Due to the action described above, the pushing and bending force is stably and symmetrically applied to the thin wall portions 12A of the side plates 12 of the closed cross sectional frame 10 such that the thin wall portions 12A are bent in an inward direction of the closed hollow cross section. Thus, the crossed cross sectional frame 10 is pressed such that a distance between the bottom plate 11 and the top plate 13 is adequately reduced.

More specifically, the entire area of the thin wall portion 12A of each side plate 12 serves as a deformation region DE which intensively receives the action of the bending force during the press processing and is thus inwardly bent like a bow-like form. That is, in the press processing, bending stress is intensively applied only to the thin wall portions 12A of the side plates 12 so that only the thin wall portions 12A of the side plates 12 undergo plastic deformation by which the hollow cross section is bent inward. Therefore, the deformation region DE is limited in an intended range. In this way, the closed cross sectional frame 10 is not deformed at unintended positions but deformed only at intended positions. Here, each thin wall portion 12A corresponds to the "bent portion" or "weakened portion" of the present disclosure.

SUMMARY

In conclusion, the seat frame for a vehicle seat of the present embodiment has a structure to be described below. Namely, the seat frame is a seat frame (closed cross sectional frame 10) for a vehicle seat (seat 1), having a closed cross sectional shape and extending in a specific direction (front-rear direction FR). The seat frame has a bent portion (thin wall portion 12A), which is formed by bending a part of the cross section of the seat frame (closed cross sectional frame 10) in an inward or outward direction (inward direction in the present embodiment), and a shape-changing structure (gradually changing structure SD) in which a bending shape of the bent portion (thin wall portion 12A) gradually changes along the specific direction (front-rear direction FR). Due to this structure, i.e. the shape-changing structure (gradually changing structure SD) in which the bending shape of the bent portion (thin wall portion 12A) changes along the specific direction (front-rear direction FR), a section modulus of the seat frame (closed cross sectional frame 10) can seamlessly change in the specific direction (front-rear direction FR). For this reason, although the section modulus of the seat frame (closed cross sectional frame 10) is not uniform, stress concentration rarely occurs in the seat frame. For this reason, it is possible to effectively optimize the structural strength of the seat frame (closed cross sectional frame 10) while saving space.

The bent portion (thin wall portion 12A) is a recess formed such that a part of the closed cross section of the seat frame (closed cross sectional frame 10) is bent inward. With this structure, it is possible to form the seat frame (closed cross sectional frame 10) that can save space.

Next, a method of manufacturing the seat frame (closed cross sectional frame 10) of the vehicle seat (seat 1) of the present embodiment includes processes to be described below. Namely, it is a method of manufacturing a seat frame (closed cross sectional frame 10) for a vehicle seat (seat 1), having a closed cross sectional shape and extending in a specific direction (front-rear direction FR). The method includes: a frame forming process (frame forming process S1) in which a seat frame (closed cross sectional frame 10) extending in the specific direction (front-rear direction FR) and having a predetermined hollow cross section is formed through molding; and a bending process (bending process S2) in which a part of the cross section of the seat frame (closed cross sectional frame 10) having a predetermined cross sectional shape and formed through the frame forming process (frame forming process S1) is bent in an inward or outward direction (inward direction in the present embodiment) of the closed cross section. In the bending process (bending process S2), the closed cross sectional shape of the seat frame (closed cross sectional frame 10) is deformed to be bent such that the closed cross sectional shape changes along the specific direction (front-rear direction FR).

As described above, through the bending process (bending process S2), the seat frame (closed cross sectional frame 10) undergoes bending deformation such that the closed cross sectional shape changes along the specific direction (the front-rear direction FR). Therefore, it is possible to seamlessly change the section modulus of the seat frame (closed cross sectional frame 10) in the specific direction (front-rear direction FR). Therefore, although there is a change in the section modulus of the seat frame (closed cross sectional frame 10), stress concentration is not likely to occur. Therefore, it is possible to effectively optimize the structural strength of the seat frame (closed cross sectional frame 10) while saving space.

In addition, the frame forming process (frame forming process S1) forms a weakened portion (thin wall portion 12A), which facilitates bending deformation of the closed cross section in an inward or outward direction (inward direction in the present embodiment), in a part of the cross section of the seat frame (closed cross sectional frame 10) that is to undergo bending deformation in the bending process (bending process S2). Due to this structure, it is possible to appropriately concentrate stress on the weakened portion (thin wall portion 12A) during the bending process (bending process S2), thereby desirably bending and deforming the seat frame (closed cross sectional frame 10) at intended positions.

In addition, the frame forming process (frame forming process S1) is performed such that the weakened portion (thin wall portion 12A), which is a region (deformation region DE) of the seat frame (closed cross sectional frame 10) to be deformed through the bending process, can be limited to a predetermined range. Because of this structure, the seat frame (closed cross sectional frame 10) can be deformed to be bent into an intended form.

In addition, the bending process (bending process S2) is performed such that a part of the cross section of the seat frame (closed cross sectional frame 10) can be deformed to be bent in an inward direction of the closed cross section. For this reason, it is possible to easily bend the seat frame (closed cross sectional frame 10) from the outside, and to reduce the space of the seat frame (closed cross sectional frame 10).

Second Embodiment

Figure 7:
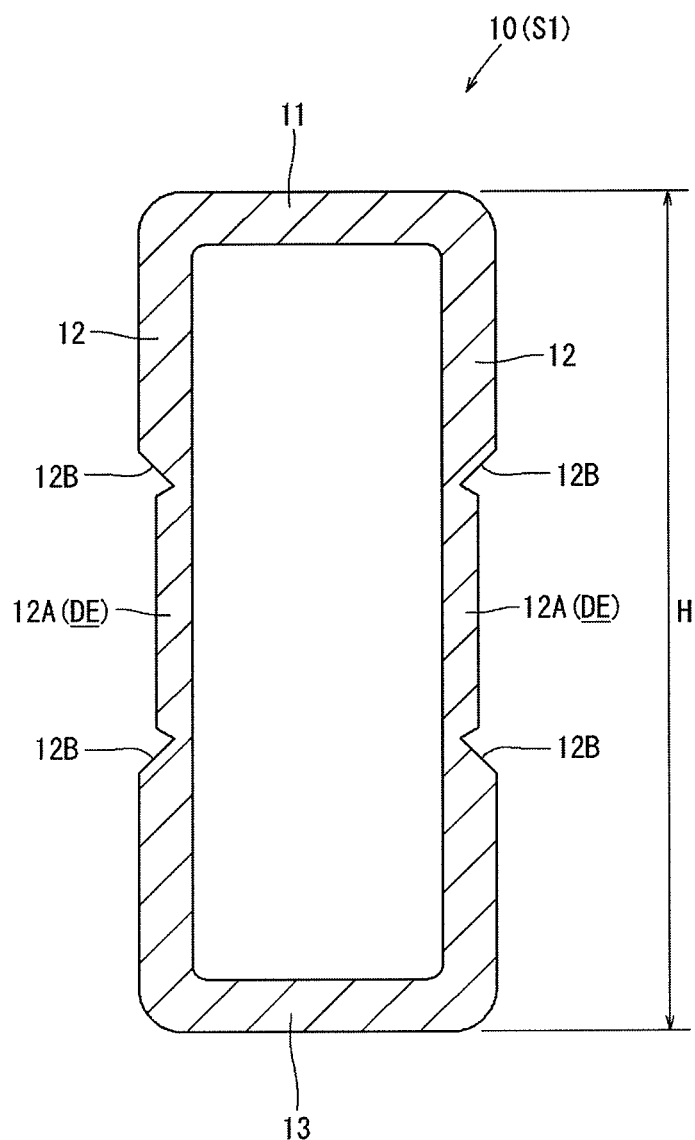
FIG. 7 is a cross sectional view illustrating a schematic structure of a seat frame for a vehicle seat according to a second embodiment, in a manner corresponding to FIG. 4.
Figure 8:
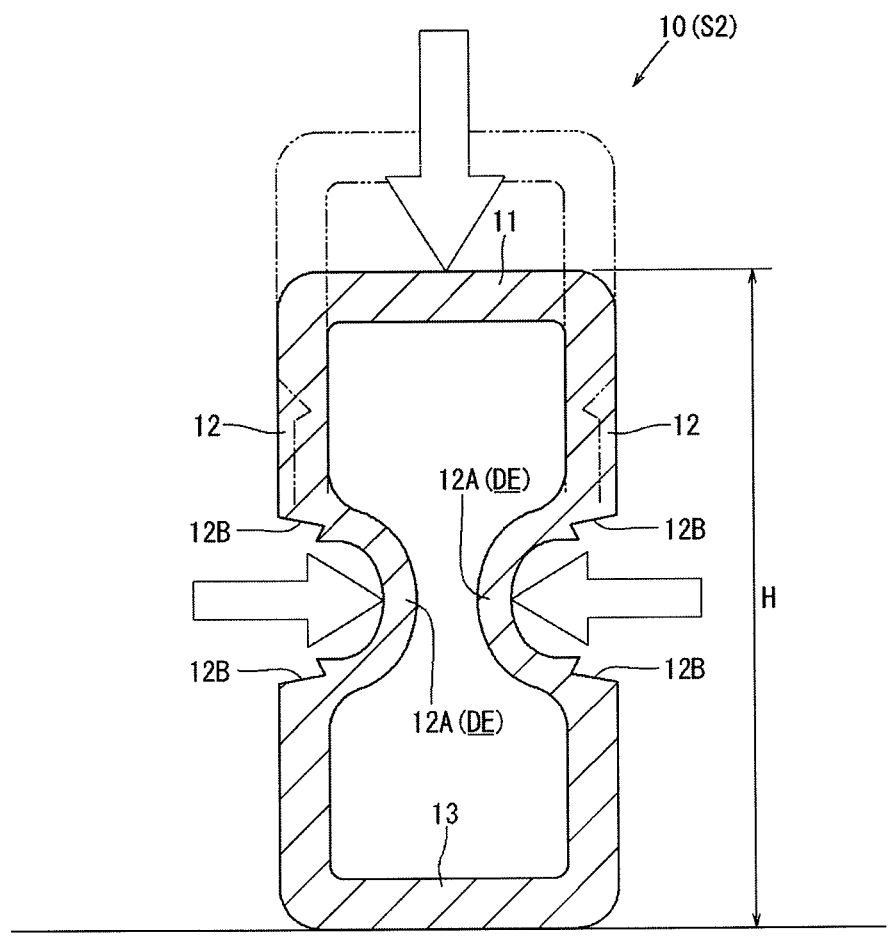
FIG. 8 is a cross sectional view illustrating a bending process in a manner corresponding to FIG. 6.

Next, a seat frame for a vehicle seat according to a second embodiment and a method of manufacturing the same will be described with reference to FIGS. 7 and 8. In the second embodiment, as illustrated in FIG. 7, two concaved portions 12B are provided respectively at an upper portion and a lower portion of each side plate 12 of the closed hollow cross sectional shape which is formed through the extrusion molding (frame forming process S1) of an aluminum member (closed cross sectional frame 10), so that the respective side plates 12 can be easily deformed to be bent in an inward direction of the closed cross section. The concaved portions 12B are V-shaped concaves formed in the outer surface of each side plate 12, and arranged at the two positions spaced from each other in the height direction. Namely, each side plate 12 has a shape in which an inner surface thereof is planar and only the outer surface thereof is partially dented due to two concaved portions arranged in the height direction.

Each of molded side plates 12 has an eccentric structure such that the two concaved portions 12B arranged in the height direction cause the outer surface of each side plate to be inwardly recessed. Accordingly, as to each side plate, as illustrated in FIG. 8, in the press processing (bending process S2) following the extrusion molding described above, a vertical compressive force applied between the bottom plate 11 and the top plate 13, acts as a force of bending the region (deformation region DE) between the concaved portions 12B in the side plate 12 in an inward direction of the hollow cross section thereof, resulting in a bow-like form. In addition, in the press processing, the region (deformation region DE) between the concaved portions 12B of each side plate 12 is also directly applied with an inward pushing force of pushing the region (deformation region DE) in an inward direction of the hollow cross section. Due to the action described above, the pushing force is symmetrically and stably applied to the left and right sides of the closed cross sectional frame 10, specifically to the regions between the concaved portions 12B of each side plate 12 such that the regions are pushed and bent in an inward direction of the hollow cross section. Thus, the closed cross sectional frame 10 is pressed such that the distance between the bottom plate 11 and the bottom plate 13 is adequately reduced.

More specifically, the region between the two concaved portions 12B of each side plate 12 is provided as the deformation region DE that intensively receives the bending force during the press processing so as to be bent in an inward direction of the hollow cross section, into a bow-like form. Namely, the deformation region DE of each side plate 12 is defined by the region between the concaved portions 12B such that each side plate 12 receives bending stress intensively only at the region between the concaved portions 12B, and thus only the region between the concaved portions 12B undergoes plastic deformation, thereby being deformed to be bent in an inward direction of the hollow cross section. Because of this structure, the closed cross sectional frame 10 can be stably deformed only at precise intended positions of each side plate 12 but cannot be deformed at positions other than the intended positions.

In the each side plate 12, the region between the concaved portions 12B, serving as the deformation region DE, is provided as the thin wall portion 12A that is thinner than other portions of the side plate 12. Because of this structure, the inward bending deformation of each deformation region DE of each side plate 12 is facilitated at the time of press processing, and each deformation region DE can be easily and properly deformed. Except for this structure, other structures of the second embodiment are the same as or similar to those of to the first embodiment. Therefore, the other structures are denoted by the same reference numerals and a description about the other structures will be omitted.

Third Embodiment

Figure 9:
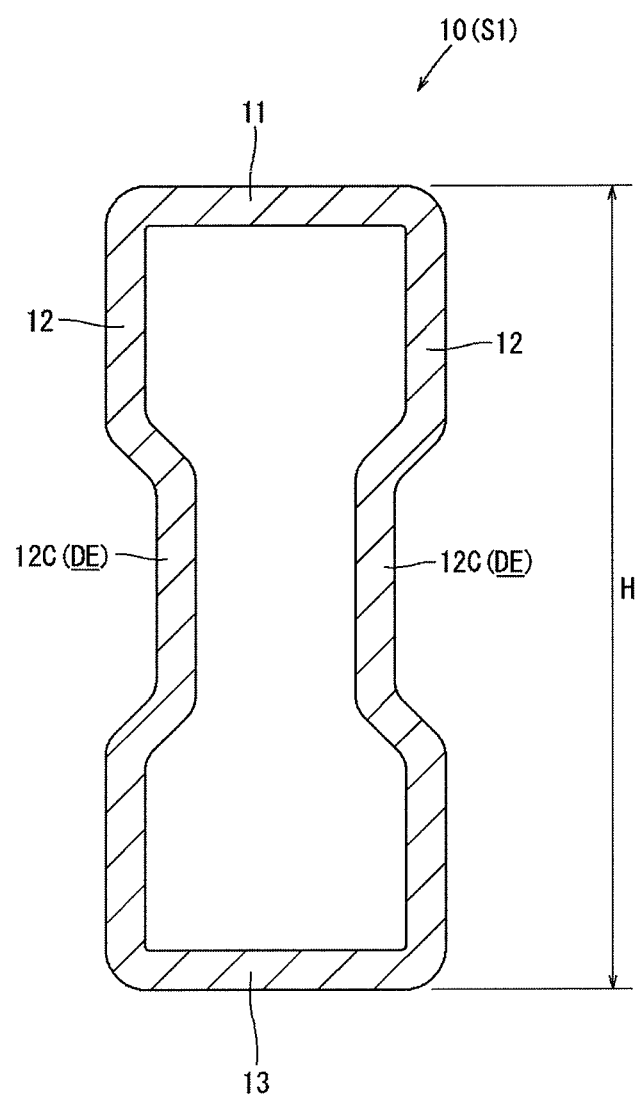
FIG. 9 is a cross sectional view illustrating a schematic structure of a seat frame for a vehicle seat according to a third embodiment in a manner corresponding to FIG. 4.
Figure 10:
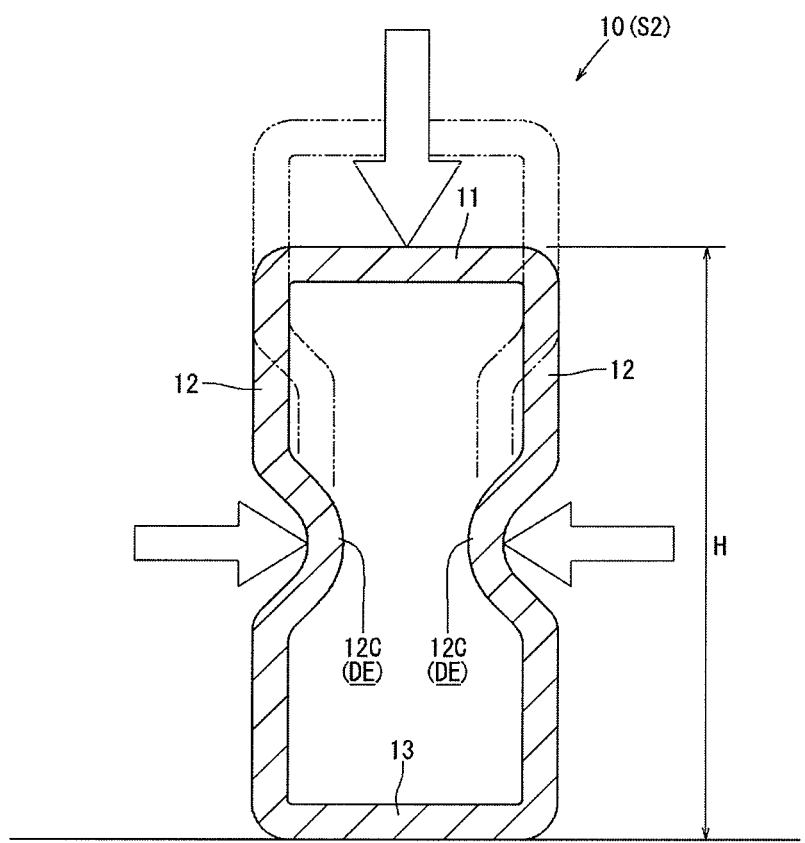
FIG. 10 is a cross sectional view illustrating a bending process in a manner corresponding to FIG. 6.

Next, a seat frame for a vehicle seat according to a third embodiment and a method of manufacturing the same will be described with reference to FIGS. 9 and 10. In the third embodiment, as illustrated in FIG. 9, an aluminum member (closed cross sectional frame 10) is formed to have a closed hollow cross section through extrusion molding (frame forming process S1). Middle portions of both side plates 12 of the aluminum member in a height direction are provided with respective eccentric portions 12C that enable the side plates 12 to be easily deformed to be bent in an inward direction of the closed cross section. The eccentric portions 12C are formed such that the middle portions in the height direction of the side plates 12 are inwardly bent in a crank shape while maintaining an equal thickness. Namely, each side plate 12 is constricted at the middle portion in the height direction thereof such that the outer surface of the middle portion is inwardly dented. Here, the eccentric portion 12C corresponds to the "bent portion" in the present disclosure.

Each molded side plate 12 is eccentrically formed such that the eccentric portion 12C provided in the middle portion thereof in the height direction makes the shape of the side plate 12 partially inwardly recessed. Accordingly, as to each side plate 12, as illustrated in FIG. 10, in the press processing (bending process S2) flowing the extrusion molding, a vertical compressive force applied between a bottom plate 11 and a top plate 13 acts as a force of bending the eccentric portion 12C of the side plate 12 in an inward direction of the hollow cross section, in a bow-like form. In addition, during the press processing, each eccentric portion 12C also receives a direct inward pushing force such that the eccentric portion 12C is bent in an inward direction of the hollow cross section. Since the pushing and bending force is symmetrically and stably applied to the eccentric portions 12C of the side plates 12 of the closed cross sectional frame 10 such that the eccentric portions 12C are bent in an inward direction of the hollow cross section, the distance between the bottom plate 11 and the top plate 13 is appropriately reduced through the press processing.

More specifically, as to each side plate 12, the eccentric portion 12C is provided as a deformation region DE that is inwardly bent into a bow-like form by intensively receiving the bending force during the press processing. That is, each side plate 12 is structured such that the deformation region DE thereof can be limited only to a region corresponding to the eccentric portion 12C. Thus, in the press processing, only the region corresponding to the eccentric portion 12C intensively receives the bending force, and thus only the region corresponding to the eccentric portion 12C undergoes inward plastic deformation. For this reason, the closed cross sectional frame 10 is formed such that each side plate 12 is stably deformed only at an intended position but is not deformed at positions other than the intended position. Other structures of the third embodiment except for this structure are the same as or similar to those of the first embodiment. Therefore, the other structures are denoted by the same reference numerals as the first embodiment and a description thereabout will be omitted.

Fourth Embodiment

Figure 11:
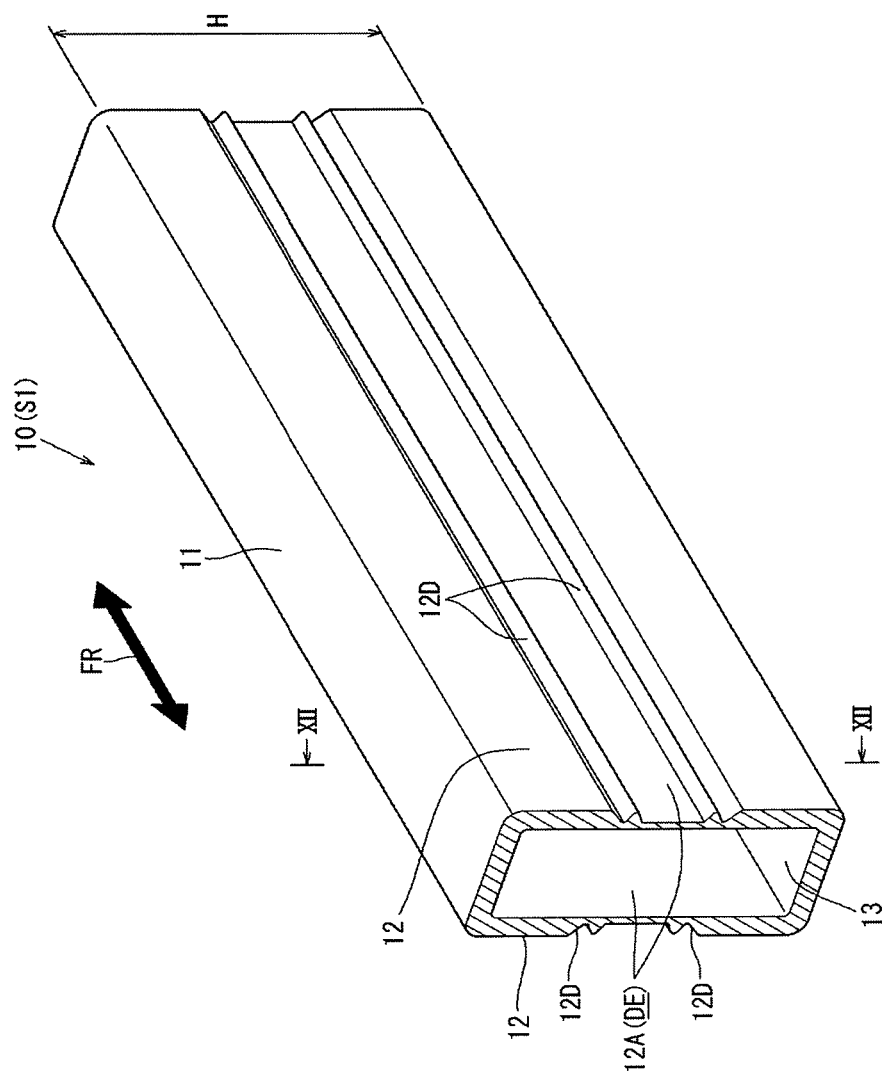
FIG. 11 is a perspective view illustrating a schematic structure of a seat frame for a vehicle seat according to a fourth embodiment as a schematic view corresponding to FIG. 3.
Figure 12:
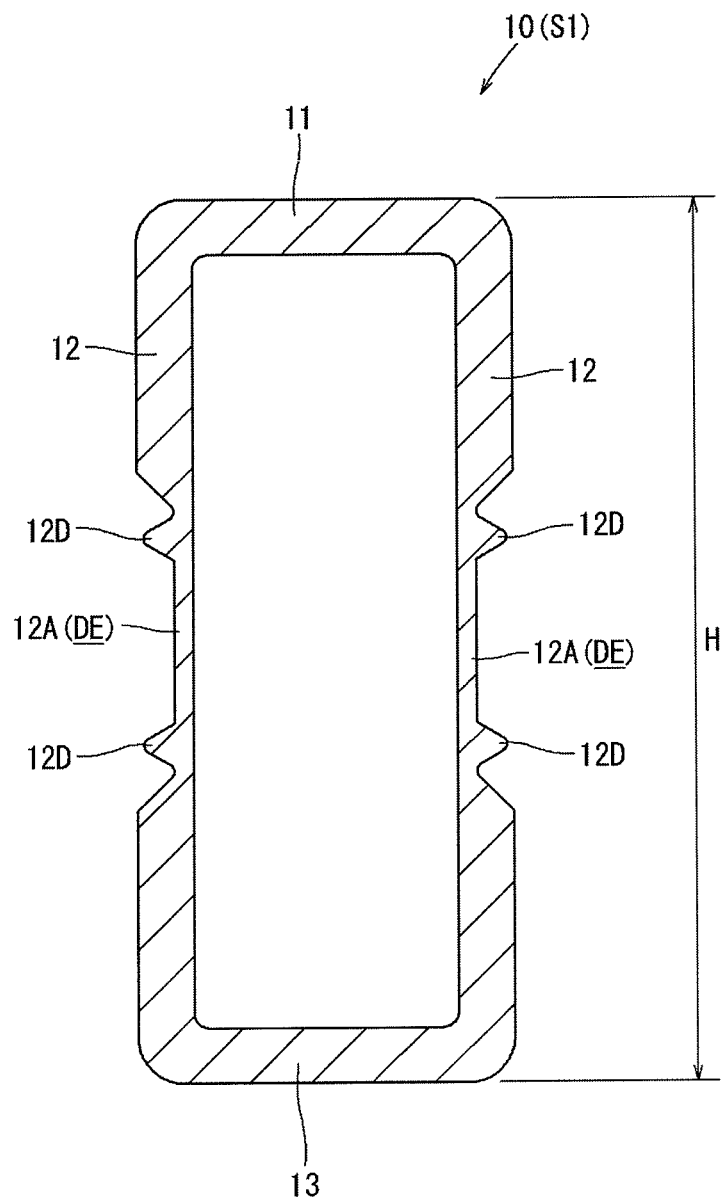
FIG. 12 is a cross sectional view taken along a line XII-XII of FIG. 11.
Figure 13:
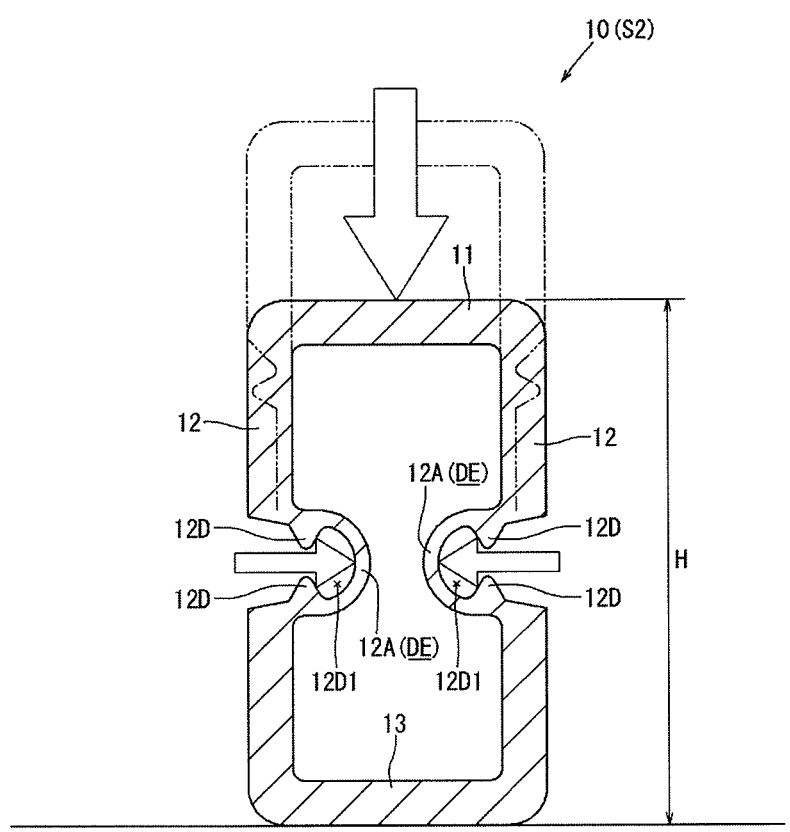
FIG. 13 is a cross sectional view illustrating a bending process in a manner corresponding to FIG. 6.

Next, a seat frame for a vehicle seat according to a fourth embodiment and a method of manufacturing the same will be described with reference to FIGS. 11 to 14. In the fourth embodiment, as illustrated in FIGS. 11 and 12, an aluminum member (closed cross sectional frame 10) is formed to have a closed hollow cross section through extrusion molding (frame forming process S1) with side plates 12. Regarding each side plate 12 of the aluminum member, triangular engagement protrusions 12D are provided at an upper side and a lower side of a thin wall portion 12A (deformation region DE), arranged in a height direction. The triangular engagement protrusions protrude outward from the outer surface of each side plate 12. As illustrated in FIG. 13, when each side plate 12 is bent in the press processing (bending process S2) flowing the extrusion molding, the upper and lower engagement protrusions 12D become closer to each other, and project respectively from the upper and the lower sides of each recess 12D1 that is formed as the thin wall portion 12A is inwardly bent in U-shaped, thereby closing an opening of the recess 12D1.

Due to the structure described above, as illustrated in FIG. 14, when a separate member such as a clip CL for binding a wire harness is fitted into the recess 12D1, each engagement protrusion 12D functions as a claw to clamp the separate member such as the clip CL fitted into the recess 12D1 in a state in which the separate member such as the clip CL is elastically engaged in the recess 12D1. Except for the structure described above, the other structures of the fourth embodiment is the same as or similar to those of the first embodiment. Thus, the other structures are denoted by same reference numerals and a description thereabout will be omitted. In this manner, i.e. the recesses 12D1 locally provided in the outer surface of the closed cross sectional frame 10 can be effectively used as fitting portions for separate members.

OTHER EMBODIMENTS

Although four embodiments according to the present disclosure have been described above, a proposal by the present disclosure can be embodied in various forms besides the embodiments described above. For example, the seat frame for a vehicle seat of the present disclosure can be applied to a front seat for an automobile besides a rear seat. Furthermore, the seat frame can be widely applied to seats for various vehicles such as trains besides cars, or for other types of vehicles such as airplanes, ships, etc. The structure of the present disclosure can be applied to a separate seat for one person as well as a bench seat for a plurality of persons. In addition, the structure of the present disclosure can also be applied to a seat frame of a seat structural member, such as a seat back, a headrest, an armrest, an ottoman, etc. as well as a seat cushion for a vehicle seat. In addition, the structure of the present disclosure can also be applied to a frame that extends in a width direction of a seat besides a side frame of the seat structural member.

The hollow cross sectional shape of the closed cross sectional frame formed through the frame forming process is not limited to a substantially rectangular cross sectional shape, but may be a circular, oval, polygonal, or any other cross sectional shape. The cross sectional shape of the closed cross sectional frame is not necessarily symmetrical laterally or vertically. That is, it may be unsymmetrical. The closed cross sectional frame can be made of various metals as well as aluminum. In addition, the hollow cross sectional shape of the closed cross sectional frame formed through the frame forming process can be formed through other forming methods such as press forming or besides forging extrusion molding.

The bent portion is not limited to an inward bent structure formed by bending a part of the cross section of the seat frame in an inward direction of the closed cross section, but it may be an outward bent structure. An example of the specific structure of the outward bent structure is a structure in which an eccentric direction of a part of the seat frame disclosed in each embodiment is an outward direction. In addition, the shape-changing structure is structured such that the bent portion may have a step shape or a curved shape other than the inclined shape. Further, the weakened portion may be a folded or bent portion to facilitate bending and deformation such that it can be easily deformed to be bent when a part of the cross section of the seat frame is bent in an inward or outward direction of the closed cross section. Alternatively, the weakened portion may be a thin-walled or inclined portion to facilitate bending and deformation.

What is claimed is:

1. A seat frame for a vehicle seat, the seat frame extending in a specific direction and having a closed cross sectional shape, the seat frame comprising:
    a bent portion having a shape in which a part of a cross section shape of the seat frame is bent inward and outward of the closed cross section; and
    a shape-changing structure in which a bending shape of the bent portion changes in the specific direction.
2. The seat frame according to claim 1
    wherein the bent portion is a recess having a shape in which the part of the cross section of the seat frame is bent inward of the closed cross section.
3. The seat frame according to claim 2,
    wherein the recess is provided as a fitting portion for a separate member.
4. The seat frame according to claim 1,
    wherein the shape-changing structure includes a narrow region, a gradually changing region, and a wide region,
    wherein each region has a height extending in a direction orthogonal to the specific direction, and
    wherein the height of the wide region is larger than the height of the gradually changing region, and the height of the gradually changing region is larger than the height of the narrow region.

* * * * *